March 26, 1940.  W. J. McGOLDRICK  2,195,219
MOTOR OPERATED MECHANISM
Filed Nov. 12, 1938

Inventor
William J. McGoldrick
By George H. Fisher
Attorney

Patented Mar. 26, 1940

2,195,219

UNITED STATES PATENT OFFICE 2,195,219

MOTOR OPERATED MECHANISM

William J. McGoldrick, Minneapolis, Minn., assignor to Minneapolis-Honeywell Regulator Company, Minneapolis, Minn., a corporation of Delaware Application November 12, 1938, Serial No. 239,977

11 Claims. (Cl. 172—239)

The present invention is concerned with a motor operated mechanism and more particularly with such a mechanism in which the motor is declutched from the mechanism operated thereby each time that the motor is placed out of operation.

An object of the present invention is to provide an arrangement employing a motor connected through a normally disengaged clutch to a device to be operated and in which means is provided to cause reengagement of the clutch a predetermined period of time after the motor has been placed in operation.

A further object of the present invention is to provide an arrangement such as set forth in the previous object in which the means for causing reengagement of the clutch comprises an electrically energized heat motor electrically connected in the energizing circuit of the motor.

A further object of the present invention is to provide an arrangement such as set out in the previous objects in which the clutch is normally held disengaged by a temperature responsive device which upon operation of the motor is heated to cause engagement of the clutch.

A still further object is to provide such an arrangement in which the rotor of the motor is effective upon energization of the motor to engage the clutch and in which the temperature responsive device acts when subjected only to ambient temperatures to disengage the clutch.

A further object of the invention is to provide such an arrangement in which the temperature responsive device is of the snap acting type.

A further object of the present invention is to employ the arrangement of the previous objects in connection with a device biased to one position so that upon disengagement of the clutch, the biasing means is able to move the device to its biased position independently of the motor.

Figure 1:
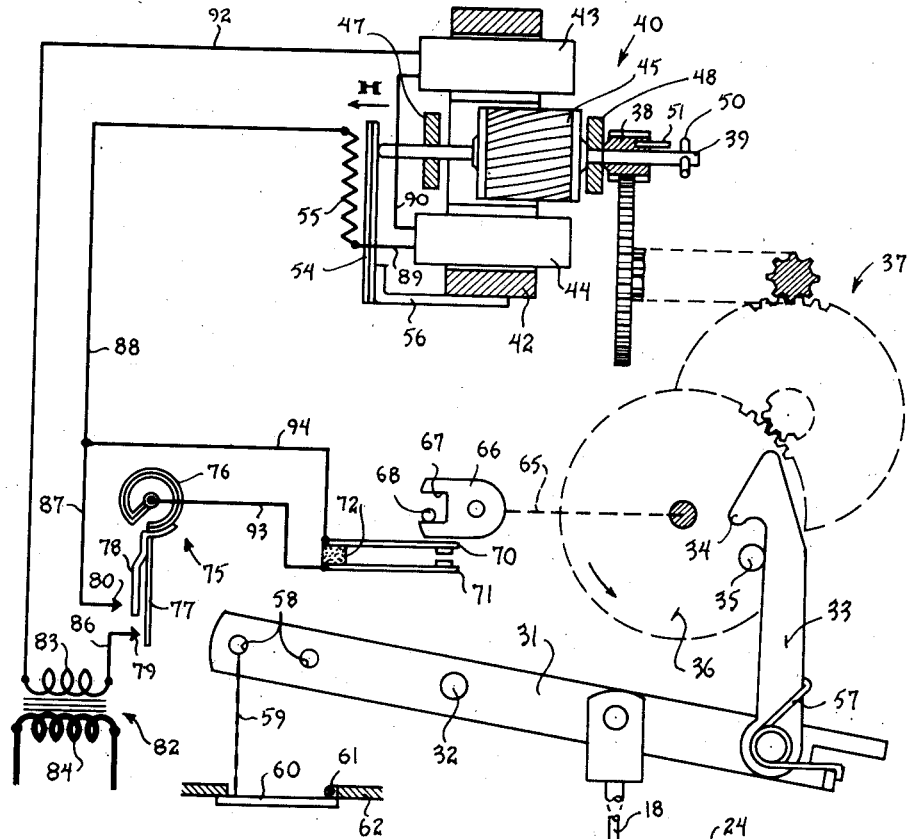
Figure 2:
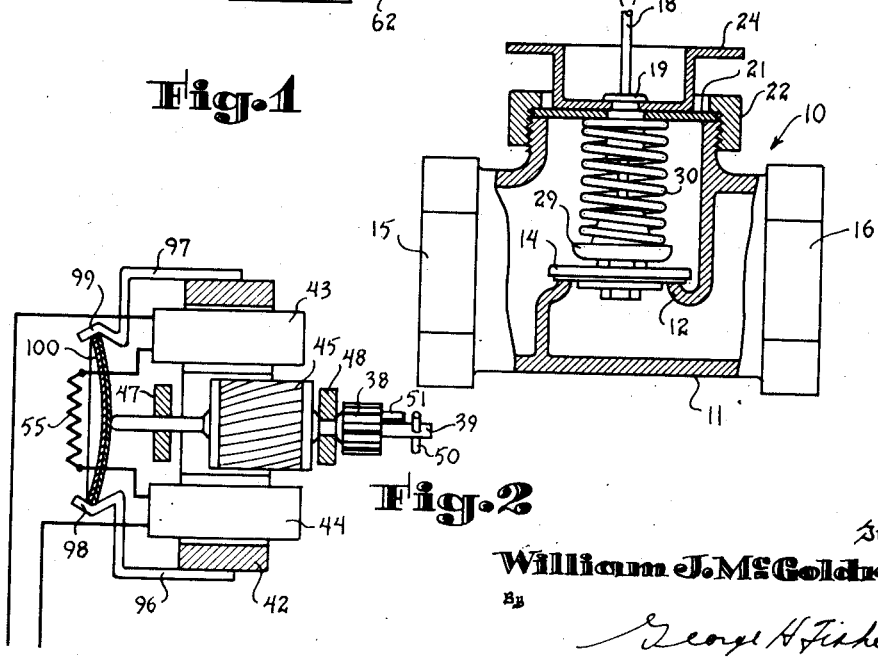

Other objects will be apparent from a consideration of the accompanying specification, claims, and drawing in which:

Figure 1 is a schematic view of the motor operated mechanism of the present invention employed in connection with a valve controlling the flow of a temperature changing medium, and Figure 2 is a schematic view of the motor portion of a modified form of the mechanism.

As indicated above, the drawing illustrates the invention employed in connection with a valve 10 controlling the flow of a temperature changing medium. The valve is shown as comprising a valve casing 11 having the usual aperture partition wall 12 upon which seats a valve disc 14.

The valve disc 14 controls the flow of fluid between the inlet 15 and the outlet 16. Secured to the valve disc 14 is a valve stem 18 which extends through a valve stem guide 19 which, in turn, extends through a closure plate 21. The closure plate 21 is secured to the valve casing 11 by means of a flanged nut 22. Secured to the closure plate 21 is a motor supporting base member 24, to which the guide 19 is secured. This base member supports the motor mechanism which in a commercial form of the device would be compactly housed in a suitable casing. In the drawing, this motor mechanism is shown in schematic form for clarity of illustration.

The valve stem 18 carries a spring retainer 29. Interposed between this spring retainer 29 and the closure plate 21 is a spring 30. The spring 30 serves to bias the valve disc 14 into closed position.

Pivotally secured to the upper end of the valve stem 18 is a lever 31. The lever 31 is pivotally mounted on a suitable supporting structure at 32. Pivotally secured to the right-hand end of lever 31 is a link 33 which is provided at its upper end with a hook 34. Hook 34 lies in the path of and is adapted to be engaged by a pin 35 carried by a gear 36. The gear 36 is the low speed gear of a reduction gear train generally designated by the reference numeral 37. The high speed end of the gear train is connected to a pinion gear 38 slidably and rotatably supported on the shaft 39 of a motor generally indicated by the reference numeral 40.

Motor 40 is shown as being of the induction type, comprising a stator core structure 42 on which are located field coils 43 and 44. A rotor 45 is carried by the shaft 39, which shaft is supported in bearing members 47 and 48.

Shaft 39 carries a drive bar 50 adjacent its right-hand end. This drive bar when the motor 40 48 is moved to the left is adapted to engage a drive pin 51 secured to and projecting from the pinion gear 38. The motor is illustrated with the drive bar 50 disengaged from the drive pin 51. When the field windings 43 and 44 are energized, the rotor 45 tends to move to a position in which it is centrally disposed with respect to the field. Such movement shifts the shaft 39 axially and brings the drive bar 50 into the path of the drive pin 51.

This axial shifting of shaft 39 by the rotor 45 is prevented, when the motor is deenergized, by a bimetallic element 54 carried by a bracket 56 secured to the stator core 42. The bimetallic element 54 is shown in its cold position and, as indicated by the legend, has its upper end deflected to the left upon temperature rise. Located adjacent the bimetal 54 is an electric heater 55 which is used to heat the bimetal 54 when it is desired to permit axial movement of the shaft 39. As will be discussed in more detail later, the heater 55 is in series with the motor field windings 43 and 44 so that the heater is energized whenever the motor is energized.

As previously indicated, the hook 34 of link 33 is adapted to be engaged by the pin 35 carried by gear 36. When the clutch formed by the drive bar 50 and drive pin 51 is engaged, the energized rotation of motor 40 is effective to rotate gear 36 in a counter-clockwise direction as indicated by the arrow thereon. A coil spring 57 serves to bias the link 33 in a clockwise direction into engagement with pin 35 so that it is assured that the hook 34 will be in the path of pin 35. The resulting upward movement of link 33, as the result of the engagement of pin 35 therewith, causes lever 31 to be rotated about pivot 32 in a counter-clockwise direction to move valve stem 18 upwardly and open valve 10.

The left-hand end of lever 31 is provided with a plurality of openings 58. These openings are intended to facilitate the fastening to the lever 31 of a chain 59 or similar device which is connected to a damper 60. The damper 60 is shown as pivotally supported at 61 to a suitable supporting wall 62. The damper 60 is biased downwardly towards open position and upon lever 31 being moved in a counter-clockwise direction, as previously described, damper 60 is permitted to open. Where the valve 10 controls the flow of gas to a gas burning furnace, the damper 60 is used as a secondary air damper to control the flow of secondary air to the burner.

The gear 36 is secured to a shaft 65, which shaft is shown in dotted lines except at its intersection with the elements secured thereto. Secured to the left-hand end of shaft 65 is a cam 66. The cam 66 is not rigidly secured to shaft 65 but is secured thereto by what is known as a "slip friction" connection. In other words, the cam 66 is merely frictionally secured to shaft 65 so that unless the movement of cam 66 is restricted, rotation of shaft 65 will result in rotation of cam 66. Any restriction in the movement of cam 66 will, however, result in cam 66 slipping with respect to shaft 65. The left-hand end of the cam 66 is provided with a recessed portion 67 and a pin 68 is disposed so as to selectively engage the opposite walls of the recessed portion 67. This pin 68 serves to limit the movement of cam 66. Thus in the position shown, a counter-clockwise movement of shaft 65 will result in limited movement of cam 66 until the pin 68 is in engagement with the upper wall of the recess 67. Thereafter the cam 66 will merely slip on shaft 65. Immediately upon the reverse movement of shaft 65, the cam 66 will start moving in the reverse direction until the pin 68 again engages the lower wall of the slot. It will be seen that the characteristics of this slip friction connection are that the movement of the operated device is restricted to a relatively narrow range and occurs immediately upon reversal of the driving member. The cam 66 is adapted to actuate a switch blade 70, which switch blade cooperates with a switch blade 71, both blades being carried by an insulating block 72. The switch including switch blades 70 and 71 is used to establish a maintaining circuit for the motor, as will be subsequently described.

In view of the showing of the invention in connection with a temperature control system, the main control switch has been shown in the form of a room thermostat designated by the reference numeral 75. This thermostat is of conventional construction, comprising a bimetallic element 76 to which is secured a flexible contact arm 77 and a relatively rigid contact arm 78. Contact arms 77 and 78 are adapted to cooperate with contacts 79 and 80, respectively. The contact arm 78 is more widely spaced from contact 80 than contact arm 77 is from contact 79. The bimetallic element 76 is so disposed that upon temperature fall the contact arms 77 and 78 are moved to the left. It will be obvious that upon such a decrease in temperature, contact arm 77 will first engage contact 79 and subsequently contact arm 78 will engage contact 80.

Low voltage power for operation of the system is obtained from a step-down transformer generally designated by the reference numeral 82. This transformer comprises a low voltage secondary 83 and a line voltage primary 84. The line voltage primary 84 is connected to some suitable source of power (not shown).

*Operation*

The various elements are shown in the position which they occupy when the temperature to which thermostat 75 is subjected is at or above the desired temperature. Let it be assumed that the temperature gradually falls. Such drop in temperature will cause engagement first of contact arm 77 with contact 79 and then of contact arm 78 with contact 80. Engagement of contact arm 77 with contact 79 has no effect. As soon, however, as contact arm 78 engages contact 80 an energizing circuit is established to the motor field windings 43 and 44 and the heater 55 as follows: from the right-hand terminal of secondary 83 through conductor 86, contact 79, contact arm 77, contact arm 78, contact 80, conductors 87 and 88, heater 55, conductor 89, field winding 44, conductor 90, field winding 43, and conductor 92 to the other terminal of secondary 83.

The establishment of the above traced circuit results in rotation of the rotor 45 and also in the energization of the heating element 55. The rotation of rotor 45 has no immediate effect upon the position of the valve inasmuch as the bimetal 54 is in its cold position and holds the clutch consisting of the drive bar 50 and drive pin 51 in its disengaged position. At the same time, the magnetic field created by the field windings 43 and 44 is tending to pull the rotor 45 into a position in which the electromagnetic center of the rotor is opposite the electromagnetic center of the field, in which position the drive bar 50 and the drive pin 51 are engaged. As the heater 55 heats up the bimetal 50, the portion of the bimetal bearing against shaft 39 is deflected to the left allowing the shaft 39 to move to the left. After this heating has continued for a predetermined period of time, the bar 50 will engage the pin 51 and the rotation of the rotor will be imparted to the gear train. It will be noted that there is a delay between the energization of the rotor and the connection of the same with the load. This delay is extremely desirable inasmuch as it gives the motor an opportunity to acquire full running speed before being connected to the load.

The connection of the rotor 45 to the gear train will result in shaft 65 being rotated in a counter-clockwise direction. After an initial amount of such rotation, the cam 66 will engage the switch blade 70 moving the same into engagement with switch blade 71. The engagement of switch blades 70 and 71 results in the establishment of the following maintaining circuit: from the right-hand terminal of secondary 83 through conductor 86, contact 79, contact arm 77, bimetal 76, conductor 93, switch blades 71 and 70, conductors 94 and 88, heating element 55, conductor 89, field winding 44, conductor 90, field winding 43, and conductor 92 to the other terminal of secondary 83. It will be noted that this circuit is independent of contacts 78 and 80 so that the motor and heater are not deenergized until the temperature has risen sufficiently to cause disengagement of contact arm 77 from contact 79. This results in the necessity of a temperature differential between the starting and stopping of the apparatus and eliminates any tendency towards a chattering operation, such as might occur when the thermostat first engaged or disengaged its contacts.

The rotation of gear 36 in a counter-clockwise direction causes pin 35 to engage the hook 34 of link 33 and rock lever 31 in a clockwise direction about pivot point 32, as previously explained. This counter-clockwise movement of lever 31 imparts an upward movement to valve stem 80 and consequently to valve disc 14 against the action of biasing spring 30. The counter-clockwise movement of lever 31 also results in the damper 60 being moved to open position. Where the system is used in connection with a gas burning furnace, the opening of valve 10 and the damper 60 results in fuel and secondary air being supplied to the burner.

When the valve reaches open position, the motor is stalled and as long as the motor is energized, it continues to hold the valve open. It will be apparent that the maintenance of the valve in open position depends upon the continuance of power for operation of the motor and in the event of power failure the valve will automatically be moved to closed position by the action of biasing spring 30. This type of valve is highly desirable from the safety standpoint inasmuch as it does not require an electrical circuit to close the valve and insures that during power failure the valve will go to the safe position. This type of valve, however, has the disadvantage that the continued stalling of the motor may tend to slightly overheat the same and cause the bearings to become slightly "sticky." If the bearings tend to bind even slightly, the resistance offered to turning of the rotor may be sufficient to prevent the spring 30 from moving the valve to closed position since the rotor is at the high speed end of the speed reducing mechanism and obviously a very slight force applied at the high speed end will result in a considerable retarding force at the low speed end.

The present invention contemplates the provision of means whereby if the motor does tend to resist rotation thereof, the valve will still be moved to closed position. Let it be assumed that the temperature rises sufficiently to cause disengagement of contact arm 77 from contact 79 so as to result in the deenergization of both the heater 55 and the field windings 43 and 44. The bimetallic element 54 now begins to cool and as it cools it moves shaft 39 to the right. When it has cooled sufficiently, the drive bar 50 is moved out of engagement with drive pin 51 so that the gear train is again disconnected from the rotor. The spring 30 is now able to readily rotate the gear train in a reverse direction and move the valve to its closed position. It is to be noted that the bimetal 54, unlike a mere spring, is capable of exerting a considerable force. Moreover, the delay introduced by the use of the bimetal is particularly advantageous in starting in that it allows the motor to acquire full speed before being connected to the load, as previously pointed out.

*Species of Figure 2*

In some instances, it may be desirable to have the rotor abruptly engage and disengage with the load at the end of the predetermined period of time required for heating or cooling. In the species of Figure 2, the arrangement is shown wherein the motor is moved in this manner. Inasmuch as all of the elements are identical with the exception of the bimetallic element and the means for supporting the same, the same reference numerals have been applied to the other elements. In view of their similarity, it is not believed that further description of these elements will be necessary.

Secured to the stator core 42 are two bracket members 96 and 97. These bracket members are provided with resilient V-shaped extensions 98 and 99, respectively. Yieldably mounted between these resilient extensions 98 and 99 is a disc 100 of bimetal which is slightly cup shaped to give a snap action. Such elements are well known and need no detailed description. The element 100 is shown in its cold position. As the element is heated up by the action of heater 55, a point will eventually be reached at which this element will abruptly snap over center permitting the engagement of drive bar 50 with drive pin 51.

Similarly, when the heater 55 is deenergized the disc 100 will continue to cool until it is able to snap back to the position shown in the drawing, in which position drive bar 50 and drive pin 51 will disengage. The species of the present invention has the advantage that the clutch is abruptly engaged and disengaged and that there is no period in which the drive bar 50 is just touching the drive pin 51 being rapidly moved past the same without actually moving the pin 51. In other words, with the arrangement of Figure 1 there is apt to be a period during which the pin 50 is periodically struck against pin 51 creating a disagreeable noise. In the arrangement of Figure 2, this is entirely overcome since the bar 50 is moved into the path of the pin 51 very quickly.

While I have shown certain specific embodiments of my invention, it is to be understood that these are for purposes of illustration only and that my invention is limited only by the scope of the appended claims.

I claim as my invention:

1. In combination, an electrical motor, a device to be operated thereby, means including a normally disengaged clutch for connecting said motor and said operated device, means for controlling the energization of said motor, and means including an electrically energized heat motor electrically connected in the energizing circuit of said motor, said last named means being operable to cause engagement of said clutch a predetermined period of time after said motor has been energized.

2. In combination; an electric motor comprising electrical windings, a stator, and a rotor; a device to be operated by said motor; means including a clutch for connecting said motor and said operated device, said clutch comprising two cooperating elements one of which is connected to the rotor and which the rotor tends to move into engagement with the other element upon energization of said electrical windings; means normally effective to bias said rotor to a position in which said clutch elements are disengaged; and means effective upon energization of said motor windings to render said biasing means ineffective after the duration of a predetermined period of time.

3. In combination; an electric motor comprising electrical windings, a stator, and a rotor; a device to be operated by said motor; means including a clutch for connecting said motor and said operated device, said clutch comprising two cooperating elements one of which is connected to the rotor and which the rotor tends to move into engagement with the other element upon energization of said electrical windings; temperature responsive means effective when subjected only to the ambient temperature to bias said rotor to a position in which said clutch elements are disengaged; and means effective upon energization of said motor windings to heat said temperature responsive means to render the same ineffective to bias said motor.

4. In combination; an electric motor comprising electrical windings, a stator, and a rotor; a device to be operated by said motor; means including a clutch for connecting said motor and said operated device, said clutch comprising two cooperating elements one of which is connected to the rotor and which the rotor tends to move into engagement with the other element upon energization of said electrical windings; temperature responsive means effective when subjected only to the ambient temperature to bias said rotor to a position in which said clutch elements are disengaged; and an electrical heater adjacent said temperature responsive means, said electrical heater being connected in the same energizing circuit as said electrical windings and being effective upon energization of said electrical windings to render said temperature responsive means ineffective to bias said rotor.

5. In combination, a motor, a device to be operated thereby, means including a clutch for connecting said motor and said operated device, said clutch including a pair of elements adapted to be interengaged, means tending to move said elements into engagement, temperature responsive means effective when subjected only to the ambient temperature to move said clutch elements out of engagement, means controlling the operation of the motor, and means effective upon said motor being placed in operation to heat said temperature responsive means to render the same ineffective to move said clutch elements out of engagement.

6. In combination, an electrical motor, a device to be operated thereby, means including a clutch for connecting said motor and said operated device, said clutch including a pair of elements adapted to be interengaged, means tending to move said elements into engagement, temperature responsive means effective when subjected only to the ambient temperature to move said clutch elements out of engagement, means controlling the energization of the motor, and an electrical heater adjacent said temperature responsive means, said electrical heater being connected in the same energizing circuit as said motor and being effective upon energization of said motor to heat said temperature responsive means to render the same ineffective to move said clutch elements out of engagement.

7. In combination, a motor, a device to be operated thereby, means including a clutch for connecting said motor and said operated device, said clutch including a pair of elements adapted to be interengaged, means tending to move said elements into engagement, snap acting temperature responsive means effective when subjected only to the ambient temperature to move said clutch elements out of engagement, means controlling the operation of the motor, and means effective upon said motor being placed in operation to heat said temperature responsive means to render the same abruptly ineffective to move said clutch elements out of engagement after a predetermined period of time.

8. In combination, an electrical motor, a device to be operated thereby, means biasing said device to a first position, means including a normally disengaged clutch for connecting said motor and said operating device, said motor being effective when energized and when said clutch is engaged to move said device against the action of said biasing means to a second position and to hold said device in said second position with said motor stalled, means for controlling the energization of said motor, and means operable to cause engagement of said clutch a predetermined period of time after said motor has been energized and to maintain such engagement during the period said motor is stalled until said motor is deenergized.

9. In combination, an electrical motor, a device to be operated thereby, means biasing said device to a first position, means including a clutch for connecting said motor and said operating device, said motor being effective when energized and when said clutch is engaged to move said device against the action of said biasing means to a second position, means for controlling the energization of said motor, and means including a heat motor operative a predetermined period of time after said motor has been deenergized to disengage said clutch and permit said biasing means to move said device back to said first position independently of said motor.

10. In combination, an electric motor comprising electrical windings, a stator, and a rotor; a device to be operated by said motor; means biasing said device to a first position; means including a clutch for connecting said motor and said device, said clutch comprising two cooperating elements one of which is connected to the rotor and which the rotor tends to move into engagement with the other element upon energization of said electrical windings; said motor being effective upon continued energization theerof to cause engagement of said clutch, to move said device against the action of said biasing means to a second position, and to hold said device in said second position; and means operative a predetermined period of time after deenergization of said motor to disengage said clutch and permit said biasing means to move said device back to said first position independently of said motor.

11. In combination, an electric motor comprising electrical windings, a stator, and a rotor; a device to be operated by said motor; means biasing said device to a first position; means including a clutch for connecting said motor and said device, said clutch comprising two cooperating elements one of which is connected to the rotor and which the rotor tends to move into engagement with the other element upon energization of said electrical windings; said motor being effective upon continued energization thereof to cause engagement of said clutch, to move said device against the action of said biasing means to a second position, and to hold said device in said second position; and means including a heat motor operative after deenergization of said motor to disengage said clutch and permit said biasing means to move said device back to said first position independently of said motor.

WILLIAM J. McGOLDRICK.